United States Patent
Piard et al.

(10) Patent No.: US 10,865,697 B2
(45) Date of Patent: Dec. 15, 2020

(54) THERMOSTAT DEVICE FOR MOTOR VEHICLE COOLING SYSTEM, COOLING SYSTEM EQUIPPED WITH SUCH A THERMOSTAT DEVICE AND METHOD OF CONTROLLING A HEATING MODULE

(71) Applicant: RENAULT s.a.s, Boulogne Billancourt (FR)

(72) Inventors: Christophe Piard, Les Clayes Sous Bois (FR); Kamal Zaoui, Ablis (FR); Vincent Santangeli, Boissy-la-Riviere (FR); Christophe Viel, Narbonne (FR); Axel Fortun, Montgeron (FR)

(73) Assignee: RENAULT s.a.s., Boulogne Billancourt (FR)

( * ) Notice: Subject to any disclaimer, the term of this patent is extended or adjusted under 35 U.S.C. 154(b) by 356 days.

(21) Appl. No.: 15/112,099

(22) PCT Filed: Jan. 6, 2015

(86) PCT No.: PCT/FR2015/050017
§ 371 (c)(1),
(2) Date: Jul. 15, 2016

(87) PCT Pub. No.: WO2015/107288
PCT Pub. Date: Jul. 23, 2015

(65) Prior Publication Data
US 2016/0341102 A1 Nov. 24, 2016

(30) Foreign Application Priority Data

Jan. 15, 2014 (FR) .................................... 14 50320
Jan. 15, 2014 (FR) .................................... 14 50323

(51) Int. Cl.
*F01P 7/16* (2006.01)
*G05D 23/30* (2006.01)
(Continued)

(52) U.S. Cl.
CPC ................. *F01P 7/167* (2013.01); *F01P 7/16* (2013.01); *F01P 2025/32* (2013.01);
(Continued)

(58) Field of Classification Search
CPC ...... G05D 23/303; G05D 23/32; G05D 23/30; F01P 2070/04; F01P 7/167
(Continued)

(56) References Cited

U.S. PATENT DOCUMENTS

| 6,766,788 | B2 * | 7/2004 | Xu .......................... F02D 41/20 123/490 |
| 2002/0053325 | A1 | 5/2002 | Fishman et al. |
| 2005/0006487 | A1 * | 1/2005 | Suda ....................... F01P 7/167 236/46 R |
| 2007/0065694 | A1 * | 3/2007 | Maier ............... H01M 8/04358 429/430 |

(Continued)

FOREIGN PATENT DOCUMENTS

| DE | 102 23 686 A1 | 12/2003 |
| DE | 103 18 355 A1 | 12/2004 |

(Continued)

OTHER PUBLICATIONS

International Search Report dated Jun. 19, 2015 for PCT/FR2015/050017 filed on Jan. 6, 2015.
(Continued)

*Primary Examiner* — David J Teitelbaum
*Assistant Examiner* — Schyler S Sanks
(74) *Attorney, Agent, or Firm* — Oblon, McClelland, Maier & Neustadt, L.L.P.

(57) ABSTRACT

A thermostat device for a motor vehicle cooling system includes a valve, a heat-sensitive component to induce opening of the valve when the temperature of the sensitive component exceeds a temperature threshold, and a heating module controlled by the sensitive component. The heating module delivers at most a maximum heating power. The heating module includes a regulating module to determine a gross useful voltage based on a measured temperature and of
(Continued)

a temperature setpoint, and a correcting module including an electrical resistor connected to an electrode. The correcting module controls the heating module either to limit the heating power delivered by the heating module to a heating power strictly lower than the maximum heating power and sufficient to induce complete opening of the valve, or so that the heating module delivers non-zero heating power that is not sufficient to induce opening of the valve.

9 Claims, 4 Drawing Sheets

(52) U.S. Cl.
CPC ....... *F01P 2025/62* (2013.01); *F01P 2025/64* (2013.01); *F01P 2070/04* (2013.01); *G05D 23/30* (2013.01); *G05D 23/303* (2013.01)

(58) Field of Classification Search
USPC .................................................. 236/95, 68 B
See application file for complete search history.

(56) References Cited

U.S. PATENT DOCUMENTS

| | | | |
|---|---|---|---|
| 2009/0301408 | A1 | 12/2009 | Mounetou et al. |
| 2012/0111956 | A1* | 5/2012 | Kinomura ............... F01P 7/167 |
| | | | 236/93 R |
| 2012/0153881 | A1* | 6/2012 | Parenti ................ H02P 21/0089 |
| | | | 318/400.02 |

FOREIGN PATENT DOCUMENTS

| | | |
|---|---|---|
| DE | 20 2010 017 836 U1 | 1/2013 |
| FR | 2 456 838 A1 | 12/1980 |
| FR | 2 896 272 A1 | 7/2007 |
| JP | 60-119319 A | 6/1985 |
| WO | 2011/089705 A1 | 7/2011 |

OTHER PUBLICATIONS

French Search Report dated Apr. 7, 2014 for FR 1450320 filed on Jan. 15, 2014.

* cited by examiner

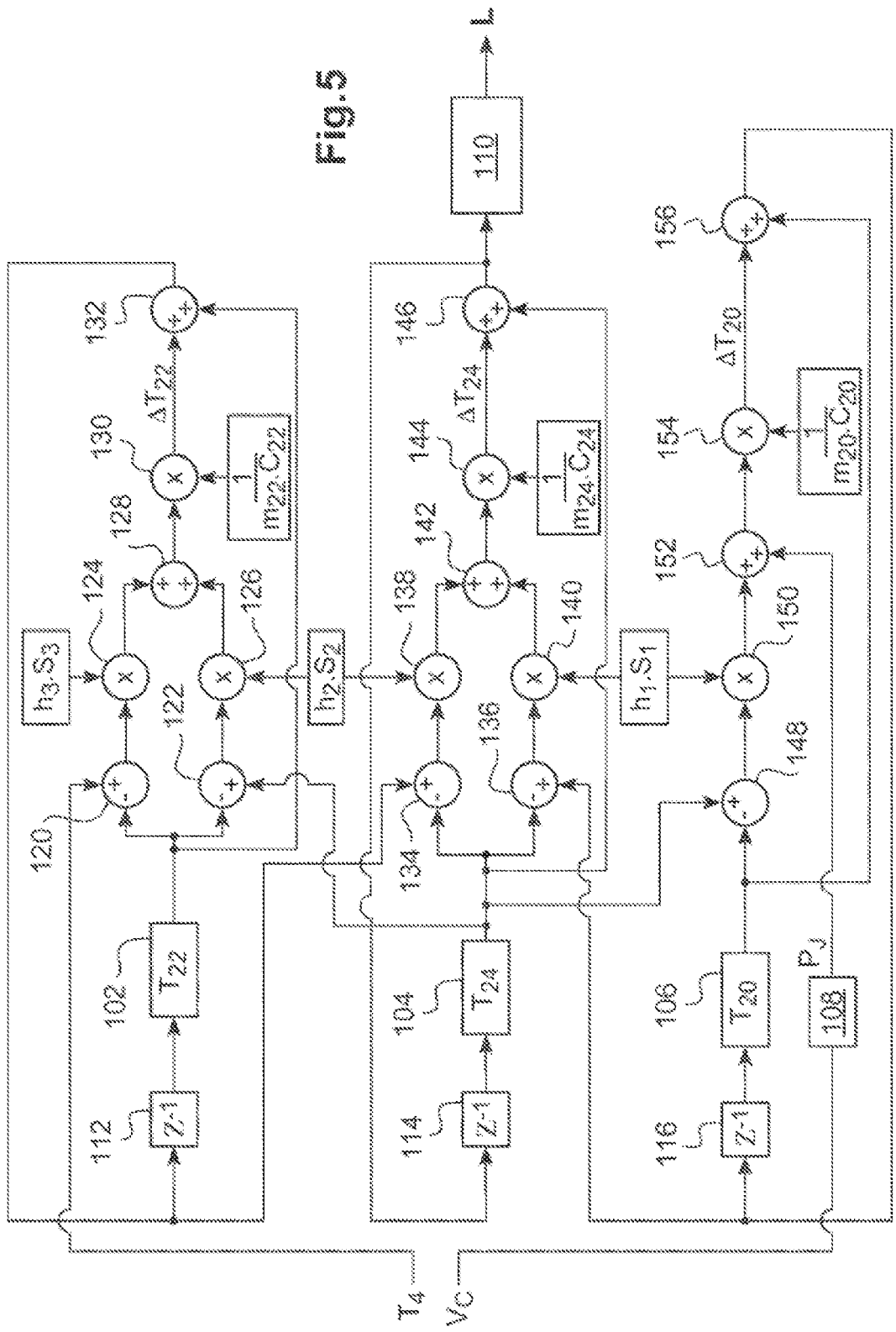

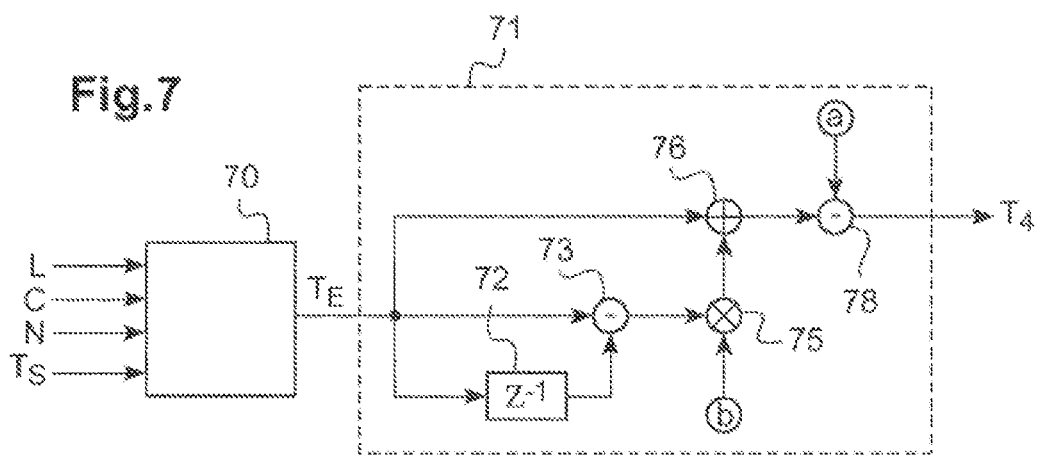
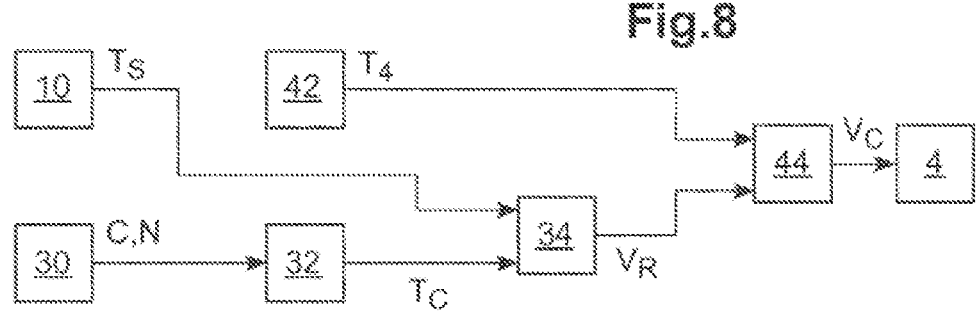
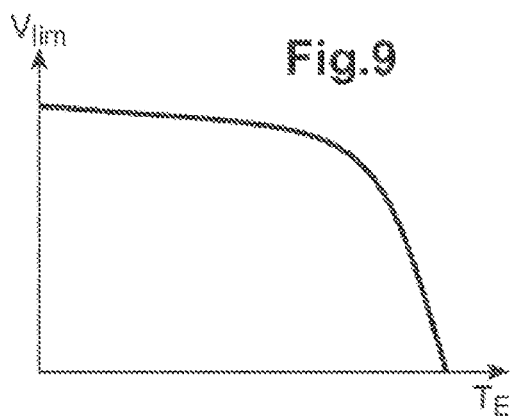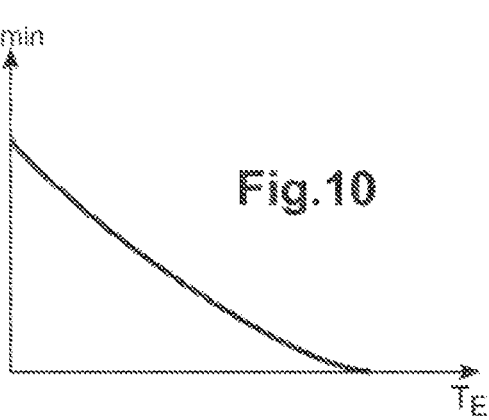

THERMOSTAT DEVICE FOR MOTOR VEHICLE COOLING SYSTEM, COOLING SYSTEM EQUIPPED WITH SUCH A THERMOSTAT DEVICE AND METHOD OF CONTROLLING A HEATING MODULE

TECHNICAL FIELD TO WHICH THE INVENTION RELATES

The present invention relates in general to the cooling of a drive engine in a motor vehicle.

It relates more particularly to a thermostat device for a motor vehicle cooling system, comprising a valve, a heat-sensitive component designed to induce opening of the valve when the temperature of the said sensitive component exceeds a temperature threshold, and a heating module controlled by the said sensitive component, this heating module being capable of delivering at most a maximum heating power.

The invention also relates to a cooling system equipped with such a thermostat device as well as a method of controlling a heating module.

TECHNOLOGICAL BACKGROUND

In systems for cooling the motor-vehicle drive engine, a thermostat that regulates the quantity of cold cooling liquid delivered by the radiator and to be injected into the engine-cooling circuit in order to obtain a setpoint temperature is commonly used.

To achieve this, the thermostat generally comprises a valve and a heat-sensitive component (typically a volume of wax) designed to induce opening of the valve when the temperature of the heat-sensitive part exceeds a temperature threshold: typically, the melting and subsequent expansion of the wax causes displacement, relative to the thermostat body, of a rod (or stick), which controls the opening of the valve.

Thus, when the cooling liquid heats up and attains the threshold temperature, the valve is opened mechanically in such a way that cold cooling liquid emerging from the radiator is injected into the cooling-liquid circuit supplying the engine, thus permitting the desired regulation of the temperature of the cooling liquid.

The use of a heating module controlled by the sensitive component has been proposed, for example an electrical resistor that heats the wax, in order to be able to open the valve by pilot control: by applying voltage to the resistor, the wax is artificially heated, thus making it possible to force the opening of the valve.

Thus this technique is used in particular when it is desired to lower the temperature of the cooling liquid in the engine rapidly or, in general, when the sought temperature is lower than that obtained by the mechanical regulation of the thermostat. The lowering (by controlled heating of the wax) of the temperature at which the valve opens can be effectively analyzed as an artificial lowering of the temperature setpoint.

The use of controlled heating to obtain early opening of the valve is described in French Patent Application FR 2896272, for example.

Following such an operation of opening of the valve by controlled heating of the sensitive component, the closing of the valve needs a non-negligible time because of the necessary cooling of the wax. This reaction time is harmful to rapid adaptation to the commands of the system. The risk then exists of greatly exceeding the setpoint because of the injection of too much cold liquid into the circuit.

In addition, the heating of the heat-sensitive component, which is necessary for opening of the valve, nevertheless implies a non-negligible reaction time. It is therefore not possible to achieve rapid forced opening of the valve.

OBJECT OF THE INVENTION

In this context, the present invention proposes a thermostat device of the type mentioned hereinabove, comprising a control module designed to control the heating module in such a way as to limit the heating power delivered by the heating module to a heating power strictly lower than the maximum heating power and sufficient to induce complete opening of the valve.

The heating of the heat-sensitive component (for example, wax) is therefore limited to a quantity of heat that nevertheless permits complete opening of the valve. Any supplementary heating of the heat-sensitive component has no utility but in fact is harmful to the reaction time of the system when later it becomes necessary to close off the valve (even partly), which necessitates cooling of the heat-sensitive component.

The sufficient heating power to which the heating power delivered by the heating module is limited is, for example, the minimum heating power sufficient to induce complete opening of the valve, such as determined by the control module on the basis of information about the temperature of the cooling liquid in the thermostat, or in view of information about the travel of the thermostat, as will be explained hereinafter. In this case the effect achieved by the invention is optimized.

According to the invention, the thermostat device such as described hereinabove may comprise a control module designed to control the heating module in such a way that it delivers non-zero heating power that is not sufficient to induce opening of the valve.

The control module therefore makes it possible to ensure minimum heating of the said sensitive component without nevertheless opening the valve. Thus, even when the valve is closed, the heat-sensitive component is being heated, thus shortening the reaction time during a subsequent phase in which the sensitive component is heated to cause opening of the valve.

According to other characteristics proposed optionally by the invention:
 the sensitive component is a volume of wax, the expansion of which above the said temperature threshold drives a mechanism designed to open the valve;
 the heating module comprises an electrical resistor;
 the control module is designed to control the heating module as a function of a temperature in the thermostat;
 the thermostat device comprises a module for estimating the temperature in the thermostat as a function of a measured temperature;
 the thermostat device comprises a transducer for measuring the temperature in the thermostat;
 the thermostat device comprises a module for determining the percentage opening of the valve, and the control module is designed to control the heating module as a function of the determined percentage opening;
 the thermostat device comprises a module for determining the flow rate of the valve, and the control module is designed to control the heating module as a function of the determined flow rate.

The invention also proposes a cooling system for a motor vehicle drive engine, comprising a radiator and a thermostat device designed such as proposed hereinabove for regulating the quantity of cooling liquid emerging from the radiator to be injected into an engine cooling circuit.

The invention additionally proposes a method for control of a heating module controlled by a heat-sensitive component of a thermostat device for a motor vehicle cooling system, the thermostat device comprising a valve and the heat-sensitive component being designed to induce the opening of the valve when the temperature of the said sensitive component exceeds a temperature threshold, the heating module being capable of delivering at most a maximum heating power, and the method comprising a step of limiting the heating power delivered by the heating module to a heating power strictly below the maximum heating power and sufficient to induce complete opening of the valve.

The invention also proposes a method for control of a heating module controlled by a heat-sensitive component of a thermostat device for a motor vehicle cooling system, the thermostat device comprising a valve and the heat-sensitive component being designed to induce the opening of the valve when the temperature of the said sensitive component exceeds a temperature threshold, the method comprising a step of controlling the heating module in such a way that it delivers a non-zero power that is not sufficient to induce opening of the valve, the heating module comprising an electrical resistor connected to an electrode (28), a regulating module (34) determines a gross useful voltage ($V_R$) on the basis of a measured temperature ($T_S$) and of a temperature setpoint ($T_C$), and a correcting module (40) corrects the gross useful voltage ($V_R$) in such a way that a minimum useful voltage is applied to the electrode (28).

DETAILED DESCRIPTION OF AN EXEMPLARY EMBODIMENT

The description hereinafter with regard to the attached drawings, provided by way of non-limitative examples, will make it possible to understand thoroughly what the invention consists of and how it can be achieved.

In the attached drawings:

FIG. 1 schematically represents the main elements of a cooling system of an internal combustion engine;

FIGS. 2a and 2b schematically represent a pilot-controlled thermostat used in the system of FIG. 1;

FIG. 3 represents a first example of a pilot-control system for such a thermostat in conformity with the teachings of the invention;

FIGS. 4a and 4b present elements of a model example used to evaluate the travel of the pilot-controlled thermostat;

FIG. 5 represents a model example of evaluation of the travel of the pilot-controlled thermostat;

FIG. 6 presents the heat exchanges involved in the cooling system in the pilot-controlled thermostat and the engine;

FIG. 7 represents a model example of evaluation of the cooling liquid temperature in the pilot-controlled thermostat;

FIG. 8 represents a second example of a pilot-control system in conformity with the teachings of the invention;

FIG. 9 presents an example of the curve of the useful voltage to be applied to achieve complete opening of the thermostat as a function of the temperature of the liquid in which the thermostat is immersed;

FIG. 10 presents an example of the curve of the useful voltage to be applied to achieve preheating of the wax of the thermostat, without nevertheless causing it to open, as a function of the temperature of the liquid in which the thermostat is immersed.

Figure 1:
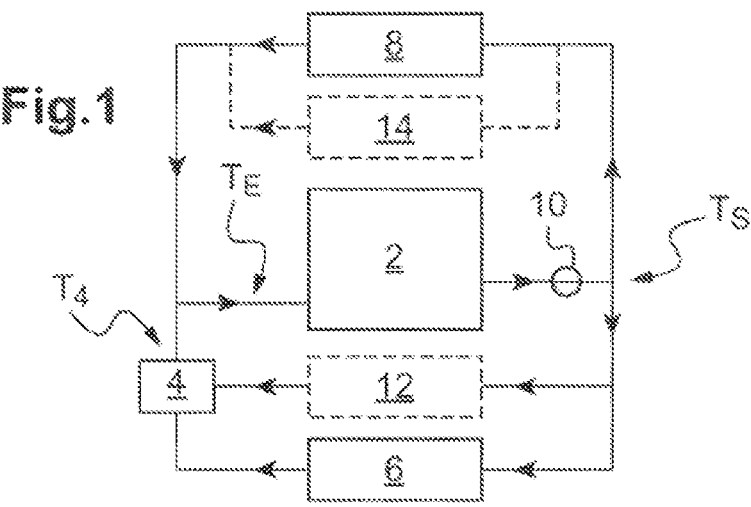

FIG. 1 represents the main elements of a cooling system of an internal combustion engine 2 of a motor vehicle. In the present case, this engine is a compression-ignition engine (diesel). Alternatively, it could be a positive-ignition engine (gasoline).

Elements present in conformity with certain alternative embodiments of the invention are represented by dashed lines in FIG. 1.

The cooling system comprises a radiator 6 which, for example is mounted at the front of the motor vehicle in order to receive the air flow generated by the movement of the vehicle, and a fan-type heat exchanger 8 that permits heating of the passenger compartment of the vehicle.

Internal combustion engine 2 has a cooling liquid circulation that ensures its functioning at a setpoint temperature given as explained hereinafter.

At the outlet of engine 2, the cooling liquid (heated by engine 2) is transported via conduits to thermostat 4 on the one hand, and to radiator 6 and to fan-type heat exchanger 8 on the other hand. After being cooled in these elements, the cooling liquid is transported by conduits to engine 2 in order to cool it.

The cooling liquid is transported from engine 2 (at the outlet) to engine 2 (at the inlet) via thermostat 4 continuously in such a way that thermostat 4 is always in contact with a flow of cooling liquid regardless of the status of thermostat 4 (open or closed).

The cooling system may if applicable also comprise a water-to-oil exchanger 12, which at the inlet receives the cooling liquid emerging from engine 2. After it has passed through water-to-oil exchanger 12, the cooling liquid is reinjected into the circuit described hereinabove, for example in thermostat 4. The use of the water-to-oil heat exchanger is not part of the present invention and therefore will not be described in detail here.

Nevertheless, the cooling liquid is transported from radiator 6 to engine 1 via a thermostatic valve or thermostat 4, which regulates the quantity of cooled cooling liquid (emerging from radiator 6) to be injected at the inlet of engine 1 in order to achieve the desired operating temperature of the engine, as explained hereinafter.

Similarly, the cooling liquid at the outlet of engine 2 can be used to regulate the temperature inside a turbocompressor 14 supplied to do so with cooling liquid by a branch of the circuit connecting engine 2 and fan-type heat exchanger 8.

In addition, a temperature transducer 10 is mounted in the cooling liquid conduits situated at the outlet of engine 2 in order to measure the temperature $T_S$ of the cooling liquid at the outlet of engine 2.

In the present exemplary embodiment, means for measuring the temperature of the cooling liquid at the inlet of engine 2 (temperature $T_E$) or in thermostat 4 (temperature $T_4$) are not provided. As a variant, as explained hereinafter, it would be possible to provide for the use of a temperature transducer in the cooling circuit close to the engine inlet in order to measure the temperature $T_E$ or in thermostat 4 in order to measure the temperature $T_4$.

Figure 2A:
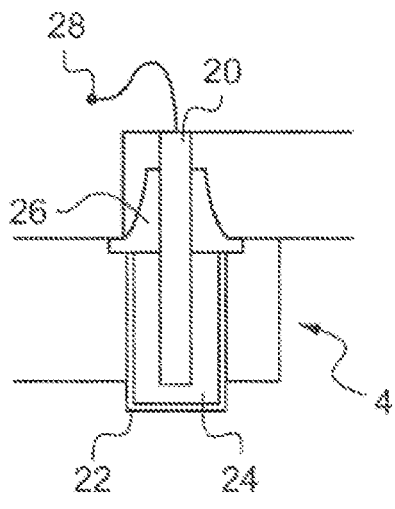
Figure 2B:
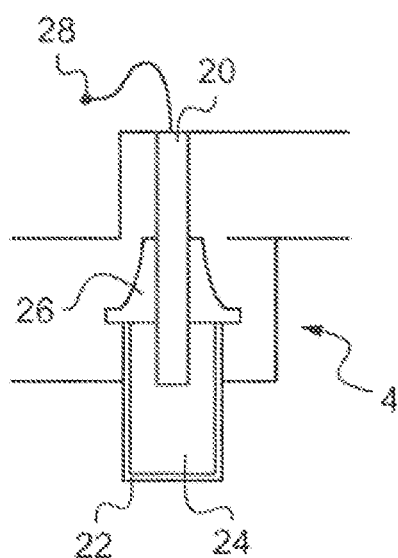

FIGS. 2a and 2b represent thermostat 4 in two separate operating positions, respectively a first position in which the thermostat closes the conduit connecting radiator 6 to engine 2 and a second position in which the thermostat opens this conduit.

Thermostat 4 comprises a rod (or "stick") 20 on which an assembly formed from a brass member 22 and a poppet (or flap) 26 is mounted slidingly. The space left open between member 22 and rod 20 is filled with a heat-sensitive material, in this case wax 24, which is enclosed sealingly in this space bounded by member 22, poppet 26 and rod 20.

Thermostat 4 is positioned in the conduit connecting radiator 6 to engine 2 in such a way that its member 22 is bathed in the cooling liquid of temperature $T_4$ at this place, as indicated hereinabove; member 22 is therefore situated downstream from poppet 26 in this conduit.

When temperature $T_4$ of the cooling liquid in thermostat 4 is lower than a predetermined threshold (defined by the thermostat design), and especially is cold (when engine 2 is stopped), wax 24 is solid and poppet 26 occupies the position illustrated in FIG. 2a, in which it obstructs the conduit: the cooling liquid emerging from radiator 6 is therefore not injected into the cooling circuit of engine 2 and therefore does not participate in cooling it.

When temperature $T_4$ of the cooling liquid in thermostat 4 reaches or even exceeds the aforesaid threshold, due in particular to the heating of the cooling liquid by engine 2 and to the absence of cooling by the cooling liquid emerging from radiator 6, was 24 melts and expands, thus causing an increase of the volume situated between member 22 and rod 20, in such a way that member 22 and rod 20 are forced to move apart, thus inducing displacement of poppet 26 and opening of thermostat 4.

In this way, cooling liquid emerging from radiator 6 (and cooled by it) is injected into the cooling circuit of engine 2 and therefore participates in cooling the engine.

In this way mechanical regulation of the temperature of the cooling liquid is achieved.

A restoring spring (not represented) is generally provided to facilitate the return of poppet 26 to its closed position when the temperature $T_4$ of the cooling liquid drops and when the wax cools and contracts.

Thermostat 4 also comprises an electrical resistor (not represented), installed for example in the interior of rod 20 and connected electrically to an electrode 28.

The application of a voltage V to electrode 28 causes a current to pass in the resistor, which generates Joule-effect heat and therefore accelerates the rise in temperature of wax 24. Thus thermostat 4 opens more rapidly than in the absence of heating by the resistor, i.e. for a cooling liquid temperature $T_4$ lower than the aforesaid threshold.

The use of heating of wax 24 (in this case by means of the resistor) therefore makes it possible to lower the regulation temperature of the cooling liquid of engine 2 artificially: thermostat 4 is a pilot-controlled thermostat.

The continuous application of a nominal voltage $V_0$ (maximum useful voltage) makes it possible to achieve generation of a maximum heating power (which depends on the thermostat design) by the resistor. A heating power lower than the maximum heating power can be obtained by applying the nominal voltage $V_0$ over only a proportion of the time period under consideration (principle of modulation by pulse width, or PWM from the English "Pulse Width Modulation"): in what follows it will be considered that a useful voltage V lower than the nominal voltage $V_0$ is applied.

Figure 3:
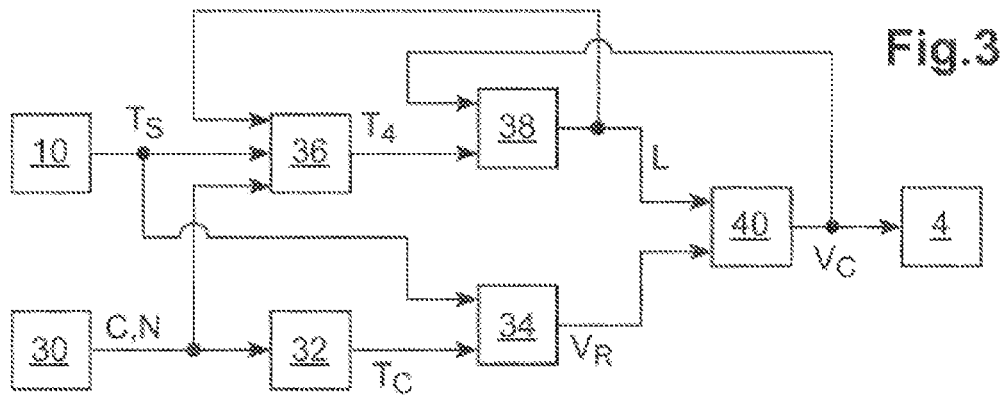

FIG. 3 represents a first example of a pilot-control system of thermostat 4 in conformity with the teachings of the invention.

The pilot-control system of FIG. 3 comprises several modules, represented here in functional form. Nevertheless, several functional modules may be used in practice by a same processing unit programmed to execute the treatments assigned respectively to these functional modules. This processing unit is, for example, an engine control computer 30 (or ECU from the English "Engine Control Unit") with which the vehicle is equipped, or a processing unit dedicated to pilot control of thermostat 4.

Regardless of the physical architecture of the pilot-control system of the thermostat, load information C (expressed in N·m) and engine-speed information N (expressed in rpm), representative of the operation of engine 2, are available within computer 30.

Such information C, N is transmitted on one hand to a module 32 for determination of a temperature setpoint $T_C$ and on the other hand to a module 36 for evaluation of the temperature $T_4$ of the cooling liquid in thermostat 4.

Setpoint-determining module 32 generates the temperature setpoint $T_C$ as a function of the engine speed N and load C on the basis of a map saved in memory in the processing unit that uses module 32. In other words, module 32 is designed to determine the temperature setpoint $T_C$ by reading a value associated with the values of engine speed N and load C received by computer 30 in a correspondence table (map) saved in memory in the processing unit in question.

As an example, setpoint-determining module 32 generates setpoints $T_C$ between 90° C. and 110° C. adapted to the different operating conditions of engine 2 that are encountered (represented by load C and engine speed N). In practice, the setpoint $T_C$ may assume a discrete set of values, for example 90° C., 100° C. or 110° C.

The temperature setpoint $T_C$ generated by setpoint-determining module 32 is transmitted to a regulating module 34, which also receives the temperature $T_S$ of the cooling liquid at the engine outlet as measured by temperature transducer 10.

On the basis of the measured temperature $T_S$ and of the temperature setpoint $T_C$, regulating module 34 determines the gross useful voltage $V_R$ to be applied to the electrode of pilot-controlled thermostat 4 in order to make the temperature of the cooling liquid converge toward the setpoint $T_C$.

The regulation rule applied by regulation module 34 to determine the gross useful voltage $V_R$ as a function of the measured temperature $T_S$ and of the setpoint temperature $T_C$ depends on the envisioned application.

For example, in the case indicated hereinabove, in which the setpoint $T_C$ can assume a discrete set of values, it is possible to imagine the following:
when the setpoint $T_C$ is equal to 110° C. (high-temperature regulation), the gross useful voltage $V_R$ is equal to 0 V, i.e. the wax-heating resistor is not being used and the temperature regulation of the cooling liquid is achieved mechanically by the thermostat (the design of which in this case is based on regulation at 110° C.);
when the setpoint $T_C$ is strictly below 110° C. (low-temperature regulation) and therefore equal to 90° C. or to 100° C. in the case described here, the gross useful voltage $V_R$ is determined, for example, as a function of the temperature error ($T_S$–$T_C$) according to a PI (proportional plus integral) mechanism.

The gross useful voltage $V_R$ generated by regulating module 34 is transmitted to a correcting module 40, the operating of which will be described hereinafter.

Module 36 for evaluation of the temperature $T_4$ of the cooling liquid in thermostat 4 receives, at the input, the temperature $T_S$ measured by measuring sensor 10 and an estimated value L of the travel of thermostat 4, and also, as already indicated, the load information C and engine speed information N representative of the operation of engine 2.

The estimated value L of travel of thermostat 4 is generated as explained in more detail hereinafter by a module 38 provided for this purpose.

On the basis of such information received at the input, module 36 evaluates temperature $T_4$ of the cooling liquid in thermostat 4, for example according to the method described in detail hereinafter with reference to FIGS. 6 and 7.

As already indicated, according to a conceivable variant, module 36 could be replaced by a temperature transducer immersed in the cooling liquid in thermostat 4.

Already mentioned module 38 for evaluation of the travel receives, at the input, the temperature $T_4$ of the cooling liquid in the thermostat (generated by evaluating module 36 in the described example) and the useful voltage value effectively applied to pilot-controlled thermostat 4 (corrected useful value $V_C$ generated by correcting module 40 as explained hereinafter).

On the basis of this information received at the input, module 36 evaluates the displacement travel L relative to rod 20 and member 22, which yields an estimate of the percentage opening of thermostat 4. The evaluation made by module 38 is achieved, for example, by the use of a numerical model, as described hereinafter with reference to FIGS. 4a, 4b and 5. As a variant, this evaluation can be made by reading the travel L associated, in a pre-recorded correspondence table, with the values of temperature $T_4$ and applied useful voltage $V_C$ received at the input. As an example, the pre-recorded values in this case were determined by means of preliminary tests or simulations, carried out beforehand, by means of the numerical model described with reference to FIGS. 4a, 4b and 5.

In this way module 38 can deliver a value L representative of the travel of thermostat 4 to correcting module 40, which also receives at the input the gross useful voltage $V_R$ calculated by regulating module 34 as already indicated.

When the gross useful voltage $V_R$ calculated by regulating module 34 is low or even zero, correcting module 40 corrects this value in such a way that a minimum useful voltage is effectively applied to electrode 28 of pilot-controlled thermostat 4 in order that the resistor will deliver a non-zero heating power, which makes it possible to preheat wax 24 to a limit temperature of opening of thermostat 4. Thus any additional heating of wax 24 (in response to a control signal from the pilot-control system to open the thermostat) will have an immediate effect of opening the valve.

In practice, by virtue of the knowledge of the estimated value L of the travel of thermostat 4 (received from module 38), correcting module 40 can determine which percentage opening of thermostat 4 is produced by the value of effectively applied useful voltage. If correcting module 40 detects closing of thermostat 4 (i.e. if L=0), it generates at the output a value of corrected useful voltage $V_C$ slightly higher than that previously applied, until slight opening of thermostat 4 is detected (still by means of estimated travel value L).

Naturally this mechanism of application of a minimum preheating voltage is maintained only as long as the gross useful voltage $V_R$ generated by regulating module 34 is lower than this minimum preheating voltage. In effect, as soon as regulating module 34 commands a gross useful voltage $V_R$ higher than the minimum preheating voltage, this gross useful voltage $V_R$ is applied as such by correcting module 30 to electrode 28 of pilot-controlled thermostat 4 (in which case $V_C=V_R$).

Correcting module 40 also brings about a limitation of applied useful voltage $V_C$ (and therefore of the heating power delivered by the resistor due to the Joule effect) in such a way that the application of this voltage $V_C$ does not cause heating greater than that which induces complete opening of thermostat 4 (i.e. a travel L equal to the maximum travel $L_{max}$). Supplementary heating is effectively pointless; in addition, it is harmful to the reaction time of the system when it is then desired to close the thermostat (since the supplementary heating of wax 24 prolongs its cooling and in turn possibly also its solidification).

In practice, when the value L of the travel of thermostat 4 received by correcting module 40 reaches the maximum travel $L_{max}$, correcting module 40 applies, to pilot-controlled thermostat 4, a useful voltage $V_C$ that does not depend on the gross useful voltage $V_R$ received from regulating module 34, but which is chosen to maintain travel L at its maximum value $L_{max}$. To achieve this, slaving of the applied useful voltage $V_C$ is used in such a way that the evaluated travel L is maintained between a predetermined value (here 0.95 $L_{max}$) and the maximum travel $L_{max}$. This case is therefore one of closed-loop control.

Naturally this mechanism of limitation of the applied voltage (and therefore of the heating power delivered by the resistor) is maintained only as long as the gross useful voltage $V_R$ generated by regulating module 34 is higher than this limited voltage. In effect, as soon as regulating module 34 commands a gross useful voltage $V_R$ lower than the limited voltage determined by the slaving described hereinabove, this gross useful voltage $V_R$ is applied as such by correcting module 30 to electrode 28 of pilot-controlled thermostat 4 (in which case $V_C=V_R$).

It may also be provided, in a manner complementary to the limitation hereinabove, that correcting module 40 causes a limitation of the effectively applied voltage $V_C$ as a function of the travel L received at the input for a range of values of this travel L.

In fact, for certain types of pilot-controlled thermostats, it is contraindicated to command a high heating power in certain opening positions of the thermostat, because the heating then risks damaging the seals that ensure leak-tightness between the rod and the member-poppet assembly.

To accomplish this, the processing unit that uses correcting module 40 has in memory a correspondence table that indicates the permissible maximum useful voltage $V_{max}$ as a function of the travel L of the thermostat. These data are provided, for example, by the thermostat manufacturer.

Correcting module 40 therefore reads, at each instant, the permissible maximum useful voltage $V_{max}$ in the table as a function of the value L of travel received from evaluating module 38 and thus determines the corrected useful voltage to be applied:

if $V_R$ is lower than $V_{max}$, $V_C=V_R$;
if $V_R$ is higher than (or equal to) $V_{max}$, $V_C=V_{max}$.

To simplify the description, the foregoing paragraph does not take into account the possible additional limitation of the applied useful voltage in order to avoid excessive heating of the wax, as proposed hereinabove.

It will be understood that, beyond the situations described hereinabove, correcting module 40 applies, to pilot-controlled thermostat 4, a useful voltage $V_C$ equal to the gross useful voltage $V_R$ received at the input from regulating module 34.

It is pointed out that, in practice, the application of a given useful voltage to thermostat 4 is achieved by applying a nominal voltage $V_0$ for a total percentage of the time such that an electrical power is generated which is equal to that which would have been obtained by continuous application of the sought useful voltage (in conformity with the principle of modulation in pulse width, or PWM from the English "Pulse Width Modulation"), as already explained hereinabove.

Figure 4A:
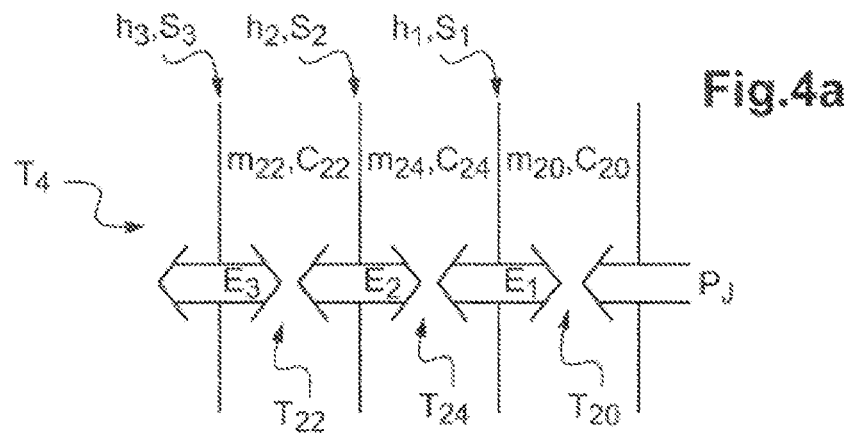

FIG. 4a presents the model used in the example described here to simulate the thermal behavior of the different parts of pilot-controlled thermostat 4 with a view to evaluating its travel as explained hereinafter.

In this model, each part of pilot-controlled thermostat 4 is represented by its mass, its specific heat capacity and its temperature (considered to be uniform over the entirety of the part in question); the definitions are as follows:

mass $m_{22}$, specific heat capacity $C_{22}$ and temperature $T_{22}$ of member 22;

mass $m_{24}$, specific heat capacity $C_{24}$ and temperature $T_{24}$ of wax 24;

mass $m_{20}$, specific heat capacity $C_{20}$ and temperature $T_{20}$ of rod 20.

It will also be considered that these different elements as well as the cooling liquid are separated by interfaces, each characterized by a surface heat transfer coefficient and an area, thus permitting the following definitions:

a transfer coefficient $h_1$ and an area $S_1$ for the interface between rod 20 and wax 24;

a transfer coefficient $h_2$ and an area $S_2$ for the interface between wax 24 and member 22;

a transfer coefficient $h_3$ and an area $S_3$ for the interface between member 22 and the cooling liquid at temperature $T_4$.

The heat exchanges are therefore modeled as follows:

the resistor heats the rod by Joule effect by delivering to it a heating power $P_J$ (directly related to the useful voltage $V_C$ applied to pilot-controlled thermostat 4);

heat exchange takes place between rod 20 and wax 24 at a power of $E_1 = h_1 \cdot S_1 \cdot (T_{20} - T_{24})$ (considered positive for heat transfer from rod 20 to wax 24);

heat exchange takes place between wax 24 and member 22 at a power of $E_2 = h_2 \cdot S_2 \cdot (T_{24} - T_{22})$ (considered positive for heat transfer from wax 24 to member 22);

heat exchange takes place between member 22 and the cooling liquid at a power of $E_3 = h_3 \cdot S_3 \cdot (T_{22} - T_4)$ (considered positive for heat transfer from member 22 to the cooling liquid).

Taking the heat balance for each part of the thermostat yields the following equations, which relate the temperatures $T_{20}$, $T_{22}$, $T_{24}$ of the different parts and the variations $\Delta T_{20}$, $\Delta T_{22}$, $\Delta T_{24}$ of each of these temperatures in time (per second when the above powers are expressed in W):

$$m_{20} \cdot C_{20} \cdot \Delta T_{20} = P_J - E_1 = P_J + h_1 \cdot S_1 \cdot (T_{24} - T_{20})$$

$$m_{24} \cdot C_{24} \cdot \Delta T_{24} = E_1 - E_2 = h_1 \cdot S_1 \cdot (T_{20} - T_{24}) + h_2 \cdot S_2 \cdot (T_{22} - T_{24})$$

$$m_{22} \cdot C_{22} \cdot \Delta T_{22} = E_2 - E_3 = h_2 \cdot S_2 \cdot (T_{22} - T_{24}) + h_3 \cdot S_3 \cdot (T_4 - T_{22}).$$

By virtue of these equations, and on the basis of evaluations or measurements of the temperature $T_4$ of the cooling liquid in thermostat 4 and of the useful voltage $V_C$ applied to thermostat 4 (which directly yields the power $P_J$ dissipated by the resistor installed in thermostat 4), it is possible to determine, at each instant, the evolution of the temperatures of the different parts of the thermostat. For initialization of the system, it may be considered that, when it is started (the resistor being inactive in the preceding instants), the temperature is homogeneous in thermostat 4 and is equal to the temperature of the cooling liquid: the initial values of $T_{20}$, $T_{22}$, $T_{24}$ are chosen to be equal to the temperature $T_4$ of the cooling liquid.

Figure 4B:
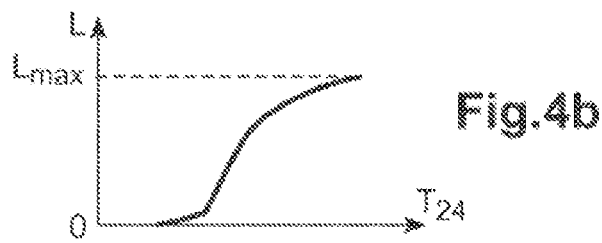

In particular, therefore, the temperature $T_{24}$ of wax 24 is known, and so the value L of travel of the thermostat can be obtained directly, for example by means of a correspondence table indicating the relationship between these two variables, as illustrated by way of example in FIG. 4b. These data (relationship between the temperature $T_{24}$ of the wax and the travel L of the thermostat) are determined, for example, by preliminary tests; they may be provided by the thermostat manufacturer.

Similarly, when the characteristics of the different parts of the thermostat (mass, heat capacity) and the interfaces (area, transfer coefficient) are unknown, it is possible to determine them by preliminary tests or by means of experimental operating curves of the thermostat: the characteristics of the different parts and of the interfaces are adapted in such a way that results or equivalent curves, determined by virtue of the model, correspond to the results of tests or to the experimental curves. (It is pointed out that it is sufficient in this case to determine the products $m_{20} \cdot C_{20}$, $m_{22} \cdot C_{22}$, $m_{24} \cdot C_{24}$ and $h_1 \cdot S_1$, $h_2 \cdot S_2$, $h_3 \cdot S_3$, and not each characteristic separately.)

FIG. 5 represents an example of module 38 for evaluation of the travel of the pilot-controlled thermostat using the model just described. This module is used, for example, within a processing unit in which, in particular, the correspondence table relating the temperature values $T_{24}$ of the wax and the travel L of the thermostat are stored in memory.

Module 38 receives at the input the temperature $T_4$ of the cooling liquid in thermostat 4 (evaluated by a dedicated module, such as module 36 shown in FIG. 3 and described hereinafter with reference to FIG. 7, or measured by a temperature transducer) and the value of the useful voltage $V_C$ applied to thermostat 4.

Module 38 comprises a unit 102 for storage in memory of the instantaneous value from evaluation of the temperature $T_{22}$ of member 22, a unit 104 for storage in memory of the instantaneous value from evaluation of the temperature $T_{24}$ of wax 24 and a unit 106 for storage in memory of the instantaneous value from evaluation of the temperature $T_{20}$ of rod 20. As indicated hereinabove, these units are initialized with the value $T_4$ of the temperature of the cooling liquid received at the input at the start of the evaluation process.

Each iteration of the process begins with estimation of new values $T_{20}$ and $T_{22}$ of the temperatures of rod 20 and member 22 respectively. This approach is used because these elements are close to heat sources and their temperature is susceptible to undergoing evolution since the preceding iteration.

To achieve this, module 38 determines the evolution $\Delta T_{20}$ of the temperature $T_{20}$ of rod 20 in the course of an iteration on the basis of the instantaneous values $T_{20}$, $T_{24}$ of temperature and useful voltage $V_C$ (received at the input) as follows.

A subtractor 148 receives the instantaneous value $T_{20}$ of unit 106 and subtracts it from the instantaneous value $T_{24}$ received from unit 104. The value generated by the subtractor is multiplied by $h_1 \cdot S_1$ in a multiplier 150. By means of an adder 152, the value obtained at the output of multiplier 150 is summed together with the power $P_J$ generated by the resistor, determined as a function of the useful voltage $V_C$ applied to the resistor by means of a conversion unit 108.

The output of adder 152 is multiplied by $1/(m_{20} \cdot C_{20})$ in a multiplier 154 in order to obtain the sought evolution $\Delta T_{20}$ (in agreement with the formula given hereinabove).

The output of multiplier 154 (evolution $\Delta T_{20}$) is added to the instantaneous value $T_{20}$ by an adder 156, thus making it possible to obtain, at the output of adder 156, the new instantaneous value from evaluation of the temperature $T_{20}$ of rod 20, which will be used by unit 106 in the following iteration (after passage for this purpose through a delay element 116).

Similarly, module 38 determines the evolution $\Delta T_{22}$ of the temperature $T_{22}$ of member 22 in the course of an iteration on the basis of the instantaneous values $T_4$ (received at the input), $T_{22}$, $T_{24}$ of temperature as follows.

A subtractor 120 receives the instantaneous value $T_{22}$ of unit 102 and subtracts it from the instantaneous value $T_4$ received at the input; similarly, a subtractor 122 receives the instantaneous value $T_{22}$ of unit 102 and subtracts it from the instantaneous value $T_{24}$ received from unit 104. The values generated by subtractors 120, 122 are multiplied respectively by $h_3 \cdot S_3$ in a multiplier 124 and by $h_2 \cdot S_2$ in a multiplier 126, then summed by an adder 128. The output of adder 128 is multiplied by $1/(m_{22} \cdot C_{22})$ in a multiplier 130 in order to obtain the sought evolution $\Delta T_{22}$ (in agreement with the formula given hereinabove).

The output of multiplier 130 (evolution $\Delta T_{22}$) is added to the instantaneous value $T_{22}$ by an adder 132, thus making it possible to obtain, at the output of adder 132, the new instantaneous value from evaluation of the temperature $T_{22}$ of member 22, which will be used by unit 102 in the following iteration (after passage for this purpose through a delay element 112).

Module 38 determines the evolution $\Delta T_{24}$ of the temperature $T_{24}$ of wax 24 in the course of an iteration (in this case lasting one second) on the basis of the instantaneous values $T_{20}$, $T_{22}$, $T_{24}$ of temperature as follows. In this case, the temperatures $T_{20}$ and $T_{22}$ used are those just calculated as described hereinabove.

A subtractor 134 receives the instantaneous value $T_{24}$ of unit 104 and subtracts it from the instantaneous value $T_{22}$ (as just calculated) received from adder 132; similarly, a subtractor 136 receives the instantaneous value $T_{24}$ of unit 104 and subtracts it from the instantaneous value $T_{20}$ (as just calculated) received from adder 156. The values generated by subtractors 134, 136 are multiplied respectively by $h_2 \cdot S_2$ in a multiplier 138 and by $h_1 \cdot S_1$ in a multiplier 140, then summed by an adder 142. The output of adder 142 is multiplied by $1/(m_{24} \cdot C_{24})$ in a multiplier 144 in order to obtain the sought evolution $\Delta T_{24}$ (in agreement with the formula given hereinabove).

The output of multiplier 144 (evolution $\Delta T_{24}$) is added to the instantaneous value $T_{24}$ by an adder 146, thus making it possible to obtain, at the output of adder 146, the new instantaneous value from evaluation of the temperature $T_{24}$ of wax 24, which will be used by unit 104 in the following iteration (after passage for this purpose through a delay element 114).

The new instantaneous value from evaluation of the temperature $T_{24}$ is also transmitted to the input of a unit 110 for conversion of the value of wax temperature into a value of travel L of the thermostat, on the basis of the correspondence table mentioned hereinabove relating the values of wax temperature and of thermostat travel.

In this way an estimate of the value of travel L of thermostat 4 is obtained in each iteration.

Figure 6:
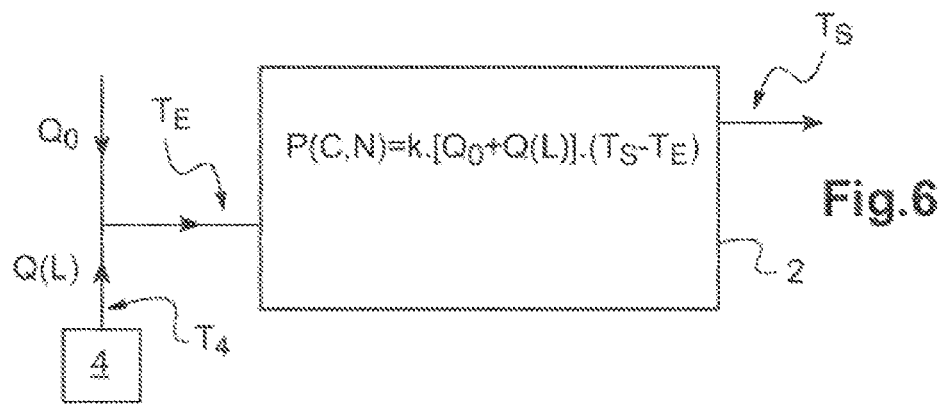

FIG. 6 shows the heat exchanges involved in the cooling system within the pilot-controlled thermostat and the engine.

As shown in FIG. 1, the flow rate of cooling liquid entering engine 2 and passing through it in order to cool it is the sum of the flow rate $Q_0$ at the outlet of the fan-type heat exchanger (and possibly of the turbocompressor) and the flow rate Q(L) at the outlet of the thermostat, which depends on the travel L of the thermostat.

Because of the heating power P(C,N) transferred by the engine, the heating of this cooling liquid flow in the engine generates a rise in temperature of the cooling liquid from its value $T_E$ at the inlet to its value $T_S$ at the outlet, as represented by the following equation:

$$P(C,N) = k \cdot [Q_0 + Q(L)] \cdot (T_S - T_E),$$

where k is a constant characteristic of the cooling liquid ($k = \rho \cdot C_P$, where p is the density of the cooling liquid and $C_P$ is its specific heat capacity or specific heat).

It is pointed out that, as indicated by its expression in the form P(C,N), the heating power transferred by the engine depends on its operating point, defined by load C and speed N.

It is proposed that these considerations be used to evaluate the cooling liquid temperature $T_E$ at the engine inlet, then the cooling liquid temperature $T_4$ in pilot-controlled thermostat 4 by means of the already mentioned evaluating module 36, for example as will now be described.

Thus FIG. 7 represents an exemplary model for evaluation of the temperature $T_4$ of the cooling liquid in the pilot-controlled thermostat.

This evaluating module receives, at the input, information L representative of the travel of thermostat 4 (determined in this case by means of evaluating module 38, an example of which was described in reference to FIGS. 4a, 4b and 5), information relating to the operating point of the engine, in this case the load C and the engine speed N (delivered, for example, by the engine control unit or ECU), and the temperature $T_S$ of the cooling liquid at the engine outlet, in this case measured by temperature transducer 10.

The processing unit that uses the module of FIG. 7 has in its memory a map of the power (P(C,N)) transferred to the cooling liquid by the engine as a function of the load C and of the engine speed N. This map is a table that indicates the values of power P transferred to the cooling liquid by the engine for respective pairs of values C, N.

This processing unit also has in its memory a plurality of values Q(L) of cooling liquid flow rate through the thermostat, associated respectively with the different possible values for the travel L.

Thus, on the basis of information received as indicated hereinabove, a sub-module 70 determines, at each instant, by reading from the memory of the processing unit, the flow rate Q(L) associated with the value L of travel received at the input and the power P(C,N) associated with the values of load C and engine speed N received at the input.

Thus sub-module 70 evaluates, at each instant t, the temperature $T_E(t)$ of the cooling liquid at the engine inlet by means of the model described hereinabove with reference to FIG. 6: $T_E(t) = T_S - P(C,N)/(k \cdot [Q_o + Q(L)])$.

The temperature information $T_E(t)$ determined by sub-module 70 is applied to a delay element 72, to a subtractor 73 (which also receives the output from delay element 72) and to an adder 76. The adder also receives the output from subtractor 73 after multiplication by a constant b in a multiplier 75.

The output of adder 76 is applied to a subtractor 78 of a constant a, which thus generates at the output an estimated value of the temperature $T_4$ of the cooling liquid in thermostat 4, which at each instant is given by:

$$T_4 = T_E(t) - a + b \cdot [T_E(t) - T_E(t-1)].$$

The arrangement of elements 72, 73, 75, 76, 78 just described thus forms a sub-module 71, which determines the estimated value of the temperature $T_4$ of the cooling liquid in thermostat 4 on the basis of the estimated value of the temperature $T_E$ of the cooling liquid at the inlet of engine 2.

In this sub-module 71, the correction applied to the temperature $T_E(t)$ by the terms a and $b \cdot [T_E(t) - T_E(t-1)]$ makes it possible to take into account the fact that the thermostat is situated slightly upstream from the engine inlet in the cooling liquid circuit and the fact that the temperature at the engine inlet results from the combination of cooling liquid arriving from the thermostat and cooling liquid arriving from the fan-type heat exchanger.

The constants a and b are determined by preliminary tests, and they may be stored in memory in the processing unit that uses the module of FIG. 7. In the embodiment described here, a=4 and b=15, for example (for temperatures expressed in ° C. or K).

According to a conceivable variant, it may be provided that the parameters a and b are variable as a function of the heating power absorbed by the fan-type water-to-air heat exchanger. During preliminary tests, the parameters a and b are determined in this case for diverse powers for heating of the vehicle passenger compartment. During operation, the values a and b are then determined at each instant as a function of the heating power (as indicated by dedicated information received, for example, from the heating control module of the passenger compartment).

In the description hereinabove, the calculation of the evaluation of the temperature $T_4$ of the cooling liquid in the thermostat as a function of the evaluation of the temperature $T_E$ of the cooling liquid at the engine inlet is presented in the form of functional modules executing different operations. In practice, these operations can be executed by a program running on the processing unit that uses the module of FIG. 7.

FIG. 8 represents a second example of a pilot-control system according to the teachings of the invention. In this figure, the numbering of the modules is identical to that used in the first example described hereinabove in reference to FIG. 3.

As for FIG. 3, the pilot-control system of FIG. 8 comprises several modules represented in functional form. Nevertheless, several functional modules could be used in practice by a same processing unit programmed to execute the treatments assigned respectively to these functional modules.

Engine control computer 30 delivers load information C (expressed in N·m) and engine speed information N (expressed in rpm), representative of the operation of engine 2. Such information C, N is transmitted to module 32 for determination of a temperature setpoint $T_C$.

As in the first example described in reference to FIG. 3, setpoint-determining module 32 generates the temperature setpoint $T_C$ as a function of the engine speed N and load C by from a correspondence table (map).

Temperature setpoint $T_C$ generated by setpoint-determining module 32 is transmitted to regulating module 34, which also receives the temperature $T_S$ of the cooling liquid at the engine outlet as measured by temperature transducer 10.

On the basis of the measured temperature $T_S$ and of the temperature setpoint $T_C$, regulating module 34 determines the gross useful voltage $V_R$ to be applied to the electrode of pilot-controlled thermostat 4 in order to make the temperature of the cooling liquid converge toward the setpoint $T_C$. For more details on regulating module 34, it will be possible to refer to the explanations provided hereinabove in connection with FIG. 3.

A correcting module 44, the operation of which is described hereinafter, receives at the input the gross useful voltage $V_R$ generated by regulating module 34 and the temperature $T_4$ of the cooling liquid in thermostat 4, as measured, for example, by a temperature transducer 42 immersed in the cooling liquid close to thermostat 4.

As a variant, the temperature $T_4$ of the cooling liquid in thermostat 4 could be evaluated by an evaluating module such as evaluating module 36 of FIG. 3, if necessary on the basis of an evaluation of the travel of the thermostat, such as that delivered by evaluating module 38 of FIG. 3.

The processing unit that uses correcting module 44 has in its memory:
  a first correspondence table that indicates the useful voltage $V_{lim}$ to be applied to obtain complete opening of the thermostat as a function of the temperature $T_4$ of the liquid in which the thermostat is immersed, for example according to the curve represented in FIG. 9;
  a second correspondence table that indicates the useful voltage $V_{min}$ to be applied to obtain preheating of the wax of the thermostat, albeit without causing it to open, as a function of the temperature $T_4$ of the liquid in which the thermostat is immersed, for example according to the curve represented in FIG. 10.

The values stored in memory are determined beforehand, for example by means of tests; in particular, they may be provided by the thermostat manufacturer.

At each instant, correcting module 44 reads the value $V_{lim}$ associated in the first correspondence table with the temperature $T_4$ received from transducer 42 and the value $V_{min}$ associated in the second correspondence table with this same temperature $T_4$.

Correcting module 44 then determines the useful voltage $V_C$ to be applied to the thermostat by correcting the gross useful voltage $V_R$ in such a way as to limit the useful voltage applied to the thermostat to the value $V_{lim}$ and to apply at least a useful voltage $V_{min}$.

Stated precisely, correcting module 44 determines the useful voltage $V_C$ to be applied to thermostat 4 as follows:
  if $V_R > V_{lim}$, $V_C = V_{lim}$;
  if $V_R < V_{min}$, $V_C = V_{min}$;
  in the other cases, $V_C = V_R$.

Thus, when correcting module 44 is not modifying the value of useful voltage (case in which $V_C = V_R$), the heating of the pilot-controlled thermostat will tend to open it in such a way that the temperature $T_S$ converges toward the setpoint temperature $T_C$, in conformity with the regulating mechanism used in regulating module 34.

On the other hand, when this mechanism commands (by way of the value $V_R$ generated by regulating module 34) heating of the wax beyond what is necessary to open thermostat 4 completely (in conformity with what is indicated by the first correspondence table), correcting module 44 limits the useful voltage (and therefore the heating power delivered by the resistor) to that which permits complete opening.

More intensive heating of the wax would effectively have no benefit, but to the contrary would be harmful to the reaction time of the system when the regulating mechanism later attempts to command closing (possibly partial) of the thermostat.

Similarly, when the regulating mechanism is not commanding (by way of the value $V_R$ generated by regulating module 34) any heating of the wax ($V_R = 0$) or is commanding weak heating, such that later heating would be necessary to bring the wax to a temperature at which it generates the start of opening of thermostat 4, correcting module 44 makes it possible to apply to thermostat 4 a useful preheating voltage (in conformity with that indicated by the second correspondence table); the heating power delivered by the resistor as a result of this preheating voltage makes it possible to heat the wax to the temperature at which any subsequent heat input will cause immediate opening of the thermostat.

The reaction time of the system in the case of command to open the thermostat (for example, by reason of a change of setpoint) is therefore reduced.

In this embodiment, the limit value $V_{lim}$ and the preheating value $V_{min}$ are determined solely on the basis of the temperature $T_4$ received at the input: this is therefore a case of an open-loop control system.

The invention claimed is:

1. A thermostat device for a motor vehicle cooling system, comprising:
   a heat-sensitive component inducing opening of a valve when a temperature of the heat-sensitive component exceeds a temperature threshold;
   a resistor connected to an electrode, the resistor being configured to deliver a maximum heating power; and
   processing circuitry configured to
      determine a gross useful voltage to be applied to the electrode to converge a measured temperature of a cooling liquid of the cooling system to a temperature setpoint,
      determine an amount of travel of the valve,
      apply the gross useful voltage to the electrode, and
      when the amount of travel of the valve reaches a maximum travel value, apply a minimum useful voltage to the electrode instead of the gross useful voltage, the minimum useful voltage being less than the gross useful voltage while still maintaining the amount of travel of the valve between a predetermined travel value and the maximum travel value.

2. The thermostat device according to claim 1, wherein the predetermined travel value is equal to 95% of the maximum travel value.

3. The thermostat device according to claim 1, wherein the heat-sensitive component is a volume of wax, the expansion of the heat-sensitive component above the temperature threshold is configured to open the valve.

4. The thermostat device according to claim 1, wherein the processing circuitry is further configured to control the resistor based on a temperature in the thermostat.

5. The thermostat device according to claim 1, wherein the processing circuitry is further configured to estimate the temperature in the thermostat based on the measured temperature.

6. The thermostat device according to claim 5, further comprising a transducer configured to measure the temperature in the thermostat.

7. The thermostat device according to claim 1, wherein the processing circuitry is further configured to determine a percentage of opening of the valve, and control the resistor based on the determined percentage opening.

8. The thermostat device according to claim 1, wherein the processing circuitry is further configured to determine a flow rate of the valve, and control the resistor based on the determined flow rate.

9. A cooling system for a motor vehicle drive engine, comprising:
   a radiator; and
   the thermostat device according to claim 1 configured to regulate a quantity of cooling liquid emerging from the radiator to be injected into a cooling circuit of the engine.

* * * * *